United States Patent [19]

Chen et al.

[11] Patent Number: 5,944,866
[45] Date of Patent: Aug. 31, 1999

[54] FABRICATION INCLUDING SOL-GEL PROCESSING

[75] Inventors: You-Lung Chen, San Diego, Calif.; Sanjay Patel, New Providence; Jorge Luis Valdes, Branchburg, both of N.J.

[73] Assignee: Lucent Technologies Inc., Murray Hill, N.J.

[21] Appl. No.: 09/089,859

[22] Filed: Jun. 3, 1998

Related U.S. Application Data

[60] Provisional application No. 60/060,141, Sep. 26, 1997.

[51] Int. Cl.⁶ .............................. C03B 8/02; C03B 37/016
[52] U.S. Cl. .............................. 65/395; 65/17.2; 65/901; 501/12; 501/54; 264/1.21; 264/621
[58] Field of Search .......................... 65/17.2, 395, 440, 65/900, 901; 501/12, 53, 54; 264/621, 1.21, 1.24

[56] References Cited

U.S. PATENT DOCUMENTS

| | | | |
|---|---|---|---|
| 4,574,063 | 3/1986 | Scherer | 65/17.2 |
| 4,614,673 | 9/1986 | Bendig | 427/376.2 |
| 4,681,615 | 7/1987 | Toki et al. | 65/18.1 |
| 4,801,318 | 1/1989 | Toki et al. | 65/18.1 |
| 4,883,521 | 11/1989 | Shimizu et al. | 65/17 |
| 4,937,208 | 6/1990 | Yamamoto et al. | 501/12 |
| 4,979,973 | 12/1990 | Takita et al. | 65/18.1 |
| 5,035,724 | 7/1991 | Pukari et al. | 51/309 |
| 5,049,338 | 9/1991 | Varaprasad et al. | 264/183 |
| 5,145,510 | 9/1992 | Saito et al. | 65/18.1 |
| 5,240,488 | 8/1993 | Chandross et al. | |
| 5,262,201 | 11/1993 | Chandra et al. | 427/376.2 |
| 5,328,645 | 7/1994 | Lin et al. | 252/315.6 |
| 5,368,887 | 11/1994 | Hoshino et al. | 427/226 |

FOREIGN PATENT DOCUMENTS

| | | |
|---|---|---|
| 0300610 | 1/1989 | European Pat. Off. . |
| 2229432 | 9/1990 | United Kingdom . |

*Primary Examiner*—Steven P. Griffin
*Attorney, Agent, or Firm*—Scott J. Rittman

[57] ABSTRACT

The invention provides an alternative to conventional sol-gel methods that utilize undesirably high amounts of a stabilizing agent such as TMAH and a gelling agent such as methyl formate. The method involves the steps of (a) providing a colloidal silica dispersion containing a stabilizing/gelling agent, where only a portion of the molecules of the agent ionize, and (b) subsequently adding to the silica dispersion a pH-reducing additive. The stabilizing/gelling agent has a dual function. The agent, e.g., an amine, initially acts as a stabilizer in the silica dispersion in that a portion of its molecules ionize, while an appreciable amount of the agent remains non-ionized. The agent later transforms in situ to a gelling agent upon addition of a pH-reducing additive. Specifically, as the pH-reducing additive lowers the pH to values at or around the $pK_a$ of the stabilizing/gelling agent, more of the agent's molecules are ionized, these cations contributing to charge neutralization, and thus gellation, of the colloidal silica particles.

14 Claims, 3 Drawing Sheets

FABRICATION INCLUDING SOL-GEL PROCESSING

CROSS-REFERENCE TO RELATED APPLICATION

This application claims priority of Provisional Application Serial No. 60/060,141 which was filed on Sep. 26, 1997.

BACKGROUND OF THE INVENTION

1. Field of the Invention

The invention relates to sol-gel processing methods.

2. Discussion of the Related Art

The manufacture of optical fiber, in one approach, involves the fabrication of an overcladding for an optical fiber preform that surrounds an inner cladding and core. The overcladding, unlike the core and inner cladding of a fiber preform, does not have to meet precise specifications. Thus, efforts to speed manufacture of preforms have often focused on easier and faster methods of forming the overcladding. One manner of forming the overcladding is the use of a sol-gel process. However, sol-gel methods tend to encounter cracking during the overcladding tube formation and subsequent drying process. Methods that suppress such tendency include, for example, the use of supercritical drying and/or the use of drying control chemical additives (DCCA), both of which are relatively expensive and laborious. Other sol-gel processes have involved the precipitation of silica particles from solution. However, such precipitation processes typically involve the use of alkali silicates, and thus require further processing steps to remove the alkali metal ions.

U.S. Pat. No. 5,240,488, the disclosure of which is hereby incorporated by reference, discloses a sol-gel process capable of producing crack-free overcladding preform tubes of a kilogram or larger. In this process, a colloidal silica dispersion, e.g., fumed silica, is obtained having a pH of 2 to 3. To obtain adequate stability of the dispersion and prevent agglomeration, the pH is raised to a value of about 11 to about 14 by use of a base. Typically, a commercially-obtained dispersion is pre-stabilized at such a pH value by addition of a base such as tetramethyl ammonium hydroxide (TMAH). Upon introduction of the TMAH, substantially complete dissociation to TMA$^+$ and OH$^-$ occurs, raising the pH value. Other quaternary ammonium hydroxides behave similarly. When the pH is so raised, the silica, it is believed, takes on a negative surface charge due to ionization of silanol groups present on the surface, in accordance with the following reaction:

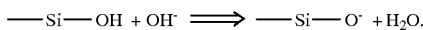

The negative charge of the silica particles creates mutual repulsion, preventing substantial agglomeration and maintaining the stability of the dispersion. In this state, the zeta potential of the particles is at a negative value. (Zeta potential is the potential across the diffuse layer of ions surrounding a charged colloidal particle, and is typically measured from electrophoretic mobilities—the rate at which colloidal particles travel between charged electrodes placed in a solution.)

At a later stage in the process, as discussed in Col. 15, lines 39–65 of U.S. Pat. No. 5,240,488, a gelling agent such as methyl formate is added to reduce the pH. It is possible to use other esters, as well. The ester reacts with the water and/or base to generate H$^+$ ions. The negative character of the silica particles is neutralized according to the following reaction:

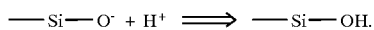

A sufficient amount of the ester must be introduced to provide enough H$^+$ ions to neutralize the silica to a degree where gellation is induced. (Gellation, as used herein, indicates that the colloidal silica particles have formed a three-dimensional network with some interstitial liquid, such that the dispersion becomes essentially non-flowing, e.g., exhibiting solid-like behavior, at room temperature.)

As mentioned above, a quaternary ammonium hydroxide commonly used for stabilizing silica sols is TMAH. A significant problem with TMAH is that during heating of the gelled tube formed from the dispersion, the TMAH breaks down into trimethyl amine, which has an extremely foul odor. Related compounds, e.g., TMAH's ethyl homolog, have similar odor problems. Similarly, methyl formate produces a by-product of formaldehyde, which is also an odorous material. Substitute materials which do not have such characteristics would be advantageous, as would sol-gel methods that require less TMAH and/or methyl formate.

SUMMARY OF THE INVENTION

The invention provides an alternative to conventional sol-gel methods that utilize undesirable amounts of stabilizing agents such as TMAH and gelling agents such as methyl formate. In particular, it has been found to be possible to use a single additive that initially stabilizes or helps stabilize a silica dispersion and then transforms in situ to a gelling agent that induces gellation of the dispersion. (The single additive is referred to herein as the stabilizing/gelling agent.) Use of the stabilizing/gelling agent desirably reduces the amount of conventional stabilizing and conventional gelling agents that are needed by serving both functions.

The method of the invention involves the steps of (a) providing a colloidal silica dispersion containing the stabilizing/gelling agent, where only a portion, e.g., about 50% or less, of the molecules of the agent are ionized, and (b) subsequently adding to the silica dispersion a pH-reducing additive. The stabilizing/gelling agent (represented for purposes of describing the invention as —R$_3$N, where R contains one or more atoms of carbon, hydrogen, oxygen, and/or nitrogen) initially acts as a stabilizer in that a portion, e.g., about 50% or less, of its molecules are ionized (e.g., to —R$_3$NH$^+$) in the dispersion. The pH of the dispersion containing the agent is typically about 8 to about 11. The pH-reducing additive is added at a concentration sufficient to lower the pH to values at or around the pK$_a$ of the stabilizing/gelling agent, such that more of the molecules of the agent are ionized. These cations in turn contribute to neutralization, and thus gellation, of the negatively-charged colloidal silica particles. (pK is the negative logarithm of the equilibrium constant K of a given reaction. The pK$_a$ is the equilibrium pH at which 50% of a compound has ionized or dissociated into its corresponding conjugate acid.) In a conventional process, the H$^+$ ions generated by a gelling agent are the primary mechanism of charge neutralization. By contrast, the invention requires only enough of such a conventional gelling agent to lower the pH to a value near the stabilizing/gelling agent's pK$_a$.

Thus, the process of the invention offers an improvement over conventional sol-gel processes. The stabilizing/gelling agent's initial stabilizing function allows one to reduce the amount of undesirable stabilizing materials like TMAH. Moreover, because the stabilizing/gelling agent itself transforms into an agent that contributes to gellation, lesser amounts of conventional gelling agents such as methyl formate are also required.

DETAILED DESCRIPTION OF THE INVENTION

Figure 1:
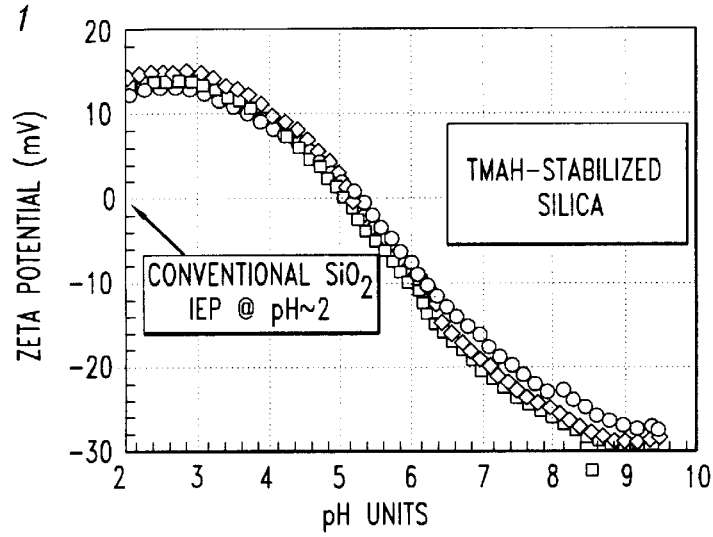
FIG. 1 is a plot of pH versus zeta potential (showing iso-electric point (IEP)) for commercially available TMAH-stabilized silica dispersions.

The invention relates to a sol-gel method for fabricating an article. In contrast to conventional methods, the invention utilizes a dual-purpose stabilizing/gelling agent that first acts as a stabilizer in a silica dispersion, and then, at a later step in the process, transforms in situ to a gelling agent that contributes to gellation of the silica.

It is possible for the stabilizing/gelling agent to be any Lewis base that acts in accord with the reaction mechanism discussed below. Examples include, but are not limited to, ammonium hydroxide and amines such as primary amines, secondary amines, and tertiary amines, or a compound containing a combination of such amines (e.g., (1-2-aminoethyl)piperazine). It is useful for the stabilizing/gelling agent to be capable of more than one ionization state (referred to herein as multi-valent), e.g., ionization states of +1, +2, and +3. Advantageous stabilizing/gelling agents comprise at least one material selected from diethylenetriamine (DETA), ethylenediamine (EDA), hexamethylenetetramine (HMTA), N,N'-dimethylethylenediamine (DMEDA), hexamethylenediamine (HMDA), tris(2-aminoethyl)amine (STAR), ethanolamine, propanolamine, and (1-2-aminoethyl)piperazine. To describe the invention, the stabilizing/gelling agent is represented herein as —$R_3N$, where R contains one or more atoms of carbon, hydrogen, oxygen, and/or nitrogen, but the stabilizing/gelling agent is not limited to only —$R_3N$ structures.

The stabilizing/gelling agent advantageously has a mean $pK_a$ of about 5 to about 13 and more preferably a mean $pK_a$ of about 5 to 11 in an aqueous solution at room temperature (where mean $pK_a$ is the arithmetic average of the individual $pK_a$ values). A multi-valent stabilizing/gelling agent will have a separate $pK_a$ for each ionization, and the individual $pK_a$ values are typically grouped closely, e.g., within 1 to 2 pH units. Some agents having several ionization states will have two or three individual $pK_a$ values within 1 or 2 pH units of each other, and a third or fourth individual $pK_a$ value several pH units below the nearest value. For example, where a stabilizing/gelling agent has three ionization states, two of which are grouped together in a pH range capable of being reached in a process, and the third of which is located 4 or 5 pH units below, the agent is referred to as functionally di-valent. An example is DETA, which has $pK_a$ values of 9.94, 8.88, and 3.70. In a typical sol-gel process, the pH will not be lowered to 3.70, and the third $pK_a$ value of DETA therefore will not be reached. Thus, DETA is functionally di-valent. The $pK_a$ values of various compounds are available from references such as D. D. Perrin et al., *$pK_a$ Prediction for Organic Acids and Bases*, Chapman and Hall, London, 1981.

In the silica dispersion, the silica typically exhibits about 20 to about 100 $m^2/g$ of surface area, with other surface areas expected to be similarly useful. It is possible to have a mixture of large and small surface area silica where the average surface area falls within the above range. The silica is typically present in the dispersion in an amount ranging from about 30 to about 60 weight percent. Colloidal silica dispersions typically have a pH of about 2 to 3. It is possible to use a dispersion in which a small amount of conventional base such as TMAH has been added, e.g., for the purpose of improving shelf life.

It is advantageous to provide a silica dispersion containing the stabilizing/gelling agent in which the pH is about 8 to about 13 (the stabilization pH). It is possible to include a sufficient amount of stabilizing/gelling agent to achieve a desired pH level. The stabilizing/gelling agent will typically increase the pH of a silica dispersion to which the agent is added. The stabilization pH is advantageously higher than the mean $pK_a$ of the stabilizing/gelling agent. When a multi-valent stabilizing/gelling agent is used, the stabilization pH is more advantageously higher than the highest individual $pK_a$ value of the multi-valent agent. The concentration of agent added depends in part on the number of valences (which reflects the effectiveness of the agent), and whether the dispersion already contains some base.

A significant feature of the invention is that only a portion, e.g., less than about 50%, of the stabilizing/gelling agent ionizes upon introduction into the silica dispersion. (For a multi-valent agent, it is possible that all of the agent will exhibit its first ionization state, but not all of the ionization states will be reached upon introduction into the dispersion). By contrast, stabilizing agents such as TMAH exhibit substantially complete dissociation upon addition to a silica dispersion. At the stabilization pH, an appreciable amount of the stabilizing/gelling agent (e.g., more than about 50%) will typically be found in its non-ionized state (e.g., —$R_3N$). (Again, for a multi-valent agent, more than about 50% of the agent will typically be found in a state below the agent's maximum valence.)

The pH-reducing additive is added to the silica dispersion that contains the stabilizing/gelling agent. The pH-reducing additive is typically readily soluble in aqueous solutions and typically acts to liberate protons into the solution at a non-instantaneous rate, e.g., dropping the pH from 12 to 7 in about 10 to about 15 minutes, by reacting with water and/or a base. The pH-reducing additive is typically a water-soluble hydrolyzable ester such as methyl formate. Other pH-reducing additives include ethyl lactate, ethyl formate, methyl acetate, and ethyl acetate. The pH-reducing additive reacts to introduce $H^+$ ions into the dispersion, and thereby lowers the pH. As the pH is lowered near, to, and/or below the $pK_a$ of the stabilizing/gelling agent (or the highest $pK_a$ of a multi-valent agent), the non-ionized molecules of the agent ionize, e.g., according to the relationship:

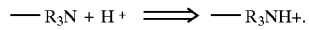

It appears that these cations associate with the negatively-charged silica particles, contributing to neutralization of the negative charges and of the mutual repulsion of the particles. The cations thereby, at least in part, appear to induce gellation of the silica. The pH-reducing additive typically drops the pH to a value ranging from about 5 to about 13. The particular pH-reducing additive, and the concentration added, are selected based largely upon the $pK_a$ value or values of the stabilizing/gelling agent, and on the desired gelling rate. The pH-reducing additive will preferably reduce the pH to within 2 pH units of the mean $pK_a$ of the stabilizing/gelling agent.

In addition to the mechanism of charge neutralization offered by the stabilizing/gelling agent's cations, two other mechanisms also appears to contribute to gellation. First, the cations from the stabilizing/gelling agent and the $H^+$ ions generated by the pH-reducing additive also promote a diminution of the double-layer charge around the silica particles. In particular, as the concentration of cations and $H^+$ ions increases, the charge contained within the double-layer surrounding each particle decreases. See, e.g., Hunter, R. J., *Foundations of Colloid Science*, Oxford Science Publications, Vol. I, 1993, at page 332.

Second, the production of $H^+$ ions by the pH-reducing additive contributes to charge neutralization according to the reaction

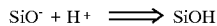

This reaction is the primary gellation mechanism of conventional sol-gel processes, as discussed previously. In the invention, by contrast, the pH-reducing additive is not itself the gelling agent, but instead promotes in situ generation of cations from the stabilizing/gelling agent, these cations constituting the primary gelling agent. Because the pH-reducing additive in conventional processes is itself the sole gelling agent, such conventional processes need a much greater amount of the pH-reducing additive than does the process of the invention.

Where the stabilizing/gelling agent is a mono-valent amine, the ionization of the agent occurs according to the following equilibrium reaction:

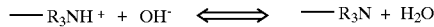

When the pH is equal to the $pK_a$, 50% of the agent's molecules are ionized. When the pH of the dispersion is raised above the agent's $pK_a$, the reaction moves to the right, and when the pH of the dispersion is lowered below the agent's $pK_a$, the reaction moves to the left. Mechanisms whereby similar, but non-equilibrium, reactions are induced are similarly useful as a basis for the in situ generation of gelling agent in accordance with the process of the invention.

For multivalent stabilizing/gelling agents, there is a separate $pK_a$ value (and separate equilibrium reaction) for each ionization that occurs. For example, where the pH of a dispersion is equal to the highest $pK_a$ of a multi-valent agent, 50% of the agent's molecules will have undergone a single ionization. Depending on the value of the second, third, etc. $pK_a$ values of the agent, however, it is possible that some of the agent's molecules will also have undergone a second or third ionization at that same pH value. In some situations, to induce gellation, it is useful to drop the pH below the stabilizing/gelling agent's mean $pK_a$. However, it is possible to obtain effective gellation even at pH values above the mean $pK_a$, depending on the particular stabilizing/gelling agent. For example, in the case of a multi-valent stabilizing/gelling agent, attainment of one or more of the individual $pK_a$ values that are above the mean $pK_a$ will in some cases induce sufficient gellation. Also, for some concentrations of certain stabilizing/gelling agents, it is possible for ionization of less than 50% of the agent to be sufficient to induce gellation.

It is advantageous for the stabilizing/gelling agent to be multi-valent. The classical DLVO (Derjaguin, Landau, Verwey, Overbeek—see Hunter, R. J., supra, at page 95) theory of colloidal stability predicts that the critical concentration required to induce gellation of a colloidal dispersion depends on the sixth power of the charge manifested on the gelling agent. According to this theory, a cation having a +2 charge is 64 times more effective than a mono-valent cation, and a cation having a +3 charge is 729 times more effective than a mono-valent cation. Thus, it is possible to use multi-valent stabilizing/gelling agents at much lower concentrations than would be required for a mono-valent agent. This is reflected in the examples below.

Figure 2:
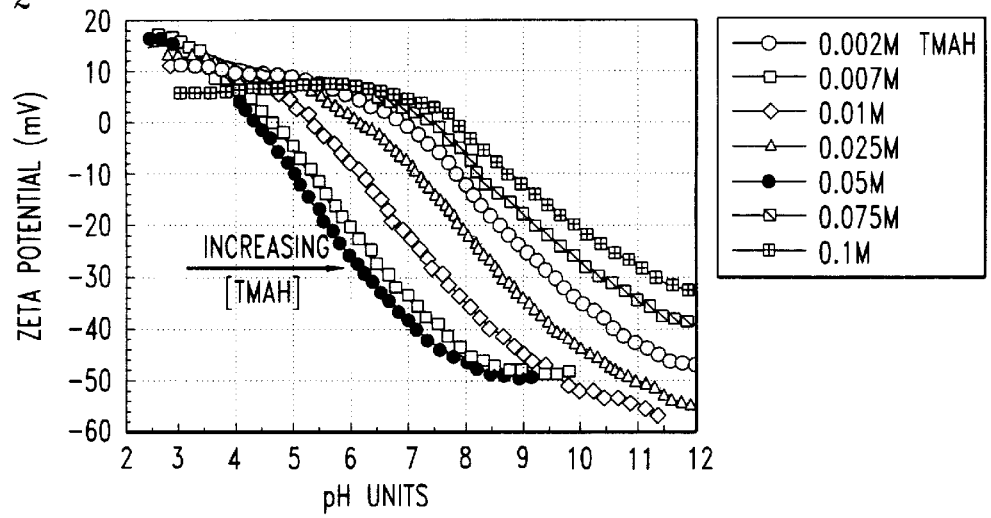
FIG. 2 is a plot of pH versus zeta potential for 1 volume percent silica dispersions at various concentrations of TMAH.
Figure 3:
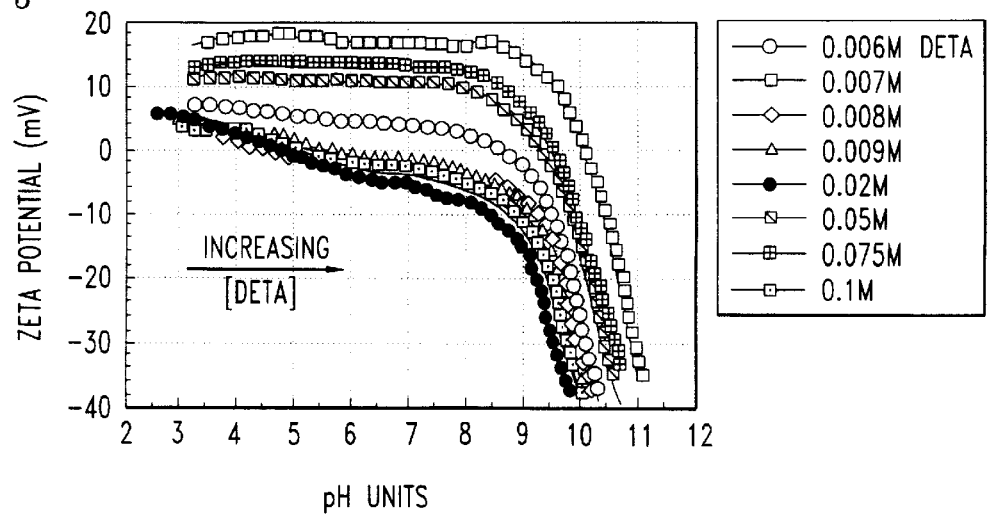
FIGS. 3 and 4 are plots of pH versus zeta potential for 1 volume percent silica dispersions at various concentrations of diethylenetriamine (DETA) and tris-(2-aminoethyl)amine (STAR), respectively.
Figure 4:
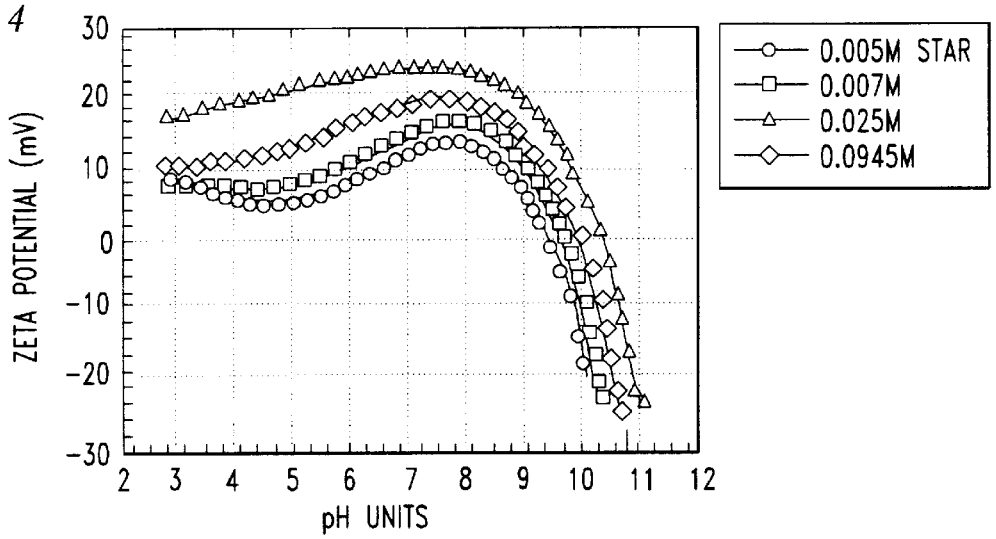

The process of the invention appears to rely on shifting of the isoelectric point (IEP) to a higher pH value. The IEP is the pH at which the zeta potential of the silica particles equals zero, i.e., the point at which the silica particles no longer mutually repel each other and at which the particles therefore gel. As shown by FIGS. 3 and 4 (discussed in detail below), where increasing concentrations of stabilizing/gelling agent are added to a silica dispersion, the IEP moves to higher pH values. The IEP is preferably shifted to a high enough pH value such that subsequent addition of an acceptably small amount of pH-reducing additive is able to lower the pH to the IEP. The reaction mechanism of the invention provides for this shifting of the IEP while requiring lower amounts of additives than currently-used processes. This is clearly shown in FIGS. 2–4. In particular, FIG. 2 shows that 0.1M of TMAH shifts the IEP to a pH of about 7.6, whereas FIG. 3 shows that 0.1M of functionally di-valent DETA shifts the IEP to greater than 9.5. Moreover, FIG. 4 shows that for tri-valent STAR ($pK_a$ values of 10.29, 9.59, and 8.56), a concentration of only 0.0945M shifts the IEP to almost 10.5. The stabilizing/gelling agent provides the silica dispersion with an IEP of about 6 or higher and preferably an IEP of about 10 or higher.

Thus, the stabilizing/gelling agents of the invention are able to shift the IEP to higher values than even greater concentrations of conventional stabilizing agents such as TMAH. And, because it is possible to shift the IEP to these higher pH values, a relatively small amount of pH-reducing additive is required to drop the pH of the stabilized dispersion to the IEP. It is therefore possible to perform the process of the invention with less additives than known processes, which is advantageous in that lower amounts of additives are more easily removed from the gelled preform during subsequent processing steps.

Figure 8:
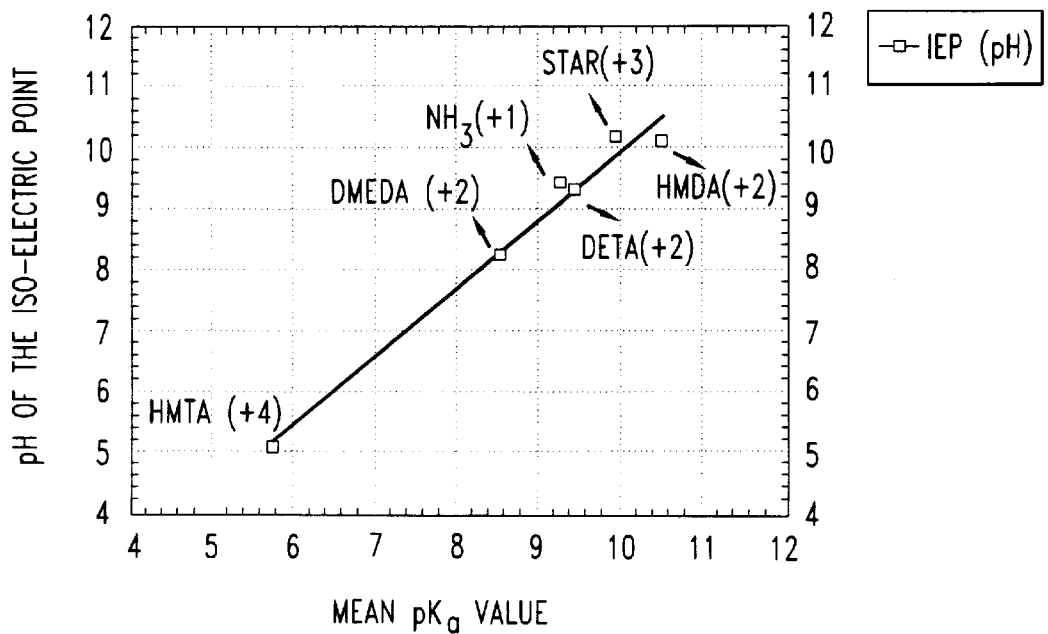
FIG. 8 reflects the correlation between IEP and mean $pK_a$ for several stabilizing/gelling agents of the invention.

Additionally, investigation of the invention led to a discovery of a correlation between the IEP and the mean $pK_a$ of the stabilizing/gelling agents. FIG. 8 reflects this correlation at a concentration of 0.1M. (The value for $NH_4OH$ was measured at 1M because its mono-valent nature is less efficient at charge compensation than multi-valent agents. By using this concentration of $NH_4OH$, it was discovered that the widely accepted IEP for silica dispersions utilizing ammonia as a base, which is 1.6, was in fact incorrect. When 1M of ammonia was used to provide sufficient charge compensation, an IEP of 9.3, and a $pK_a$ of 9.247, were measured, these values falling within the IEP/$pK_a$ correlation discovered by the inventors.) This correlation provides an extremely useful tool for predicting the conditions required for gellation based on knowledge of the thermodynamic ionization properties of the stabilizing /gelling agent, and for selecting the types and amounts of stabilizing/ gelling agent and pH-reducing additive. Specifically, for a given concentration of a certain stabilizing/gelling agent, it is possible from this correlation to approximate the concentration of pH-reducing additive required to induce cation formation and gellation.

Figure 5:
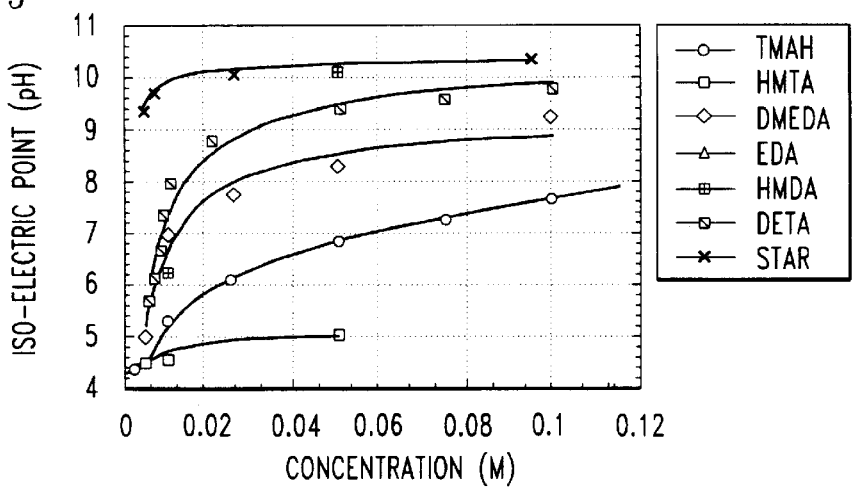
FIG. 5 is a plot of iso-electric point (IEP) versus stabilizing/gelling agent concentration for several stabilizing/gelling agents of the invention.
Figure 6:
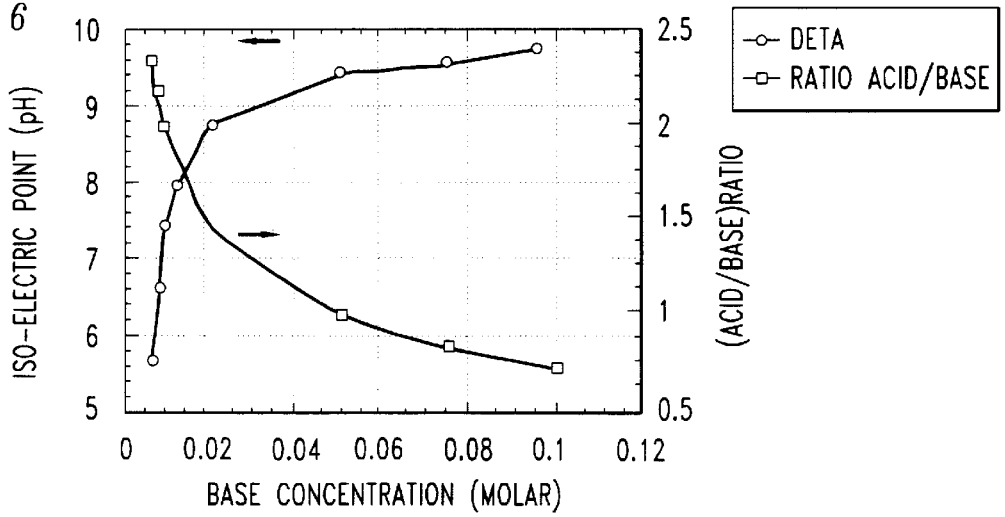
FIGS. 6 and 7 are plots of IEP and the acid/base ratio as a function of stabilizing/gelling agent concentration, for DETA and STAR, respectively.

However, as shown in FIGS. 5 and 6, there is not a 1-to-1 correspondence between the concentration of stabilizing/ gelling agent and the acid equivalents, e.g., amount of pH-reducing agent, needed to induce gellation. The amount of pH-reducing agent required therefore depends largely on the concentration of stabilizing/gelling agent. To use the IEP/$pK_a$ correlation for dispersions having a particular concentration of stabilizing/gelling agent, the acid equivalents required to induce gellation of the dispersions are carefully measured during titration of the dispersion. Then, for future uses of the dispersions, the approximately amount of acid equivalents, and thus the amount of pH-reducing agent, is known.

In addition to the steps of gelling the silica dispersion, several other steps are typically performed to obtain an overcladding tube. See, e.g., U.S. Pat. No. 5,240,488, referenced above. It is possible for additives such as binders or plasticizers to be added to the dispersion prior to gellation. The dispersion is typically placed into a mold containing a central mandrel, either prior to or subsequent to addition of the pH-reducing additive. The gelled body is generally aged in the mold, for a time period ranging from less than an hour to more than a day, and then extracted, typically by launching the tube in water. Once extracted, the body is normally dried on rollers for days or weeks. Organic volatile components and water are typically removed by heating. The reduced amounts of such volatiles introduced by the process of the invention contribute to lower heating times than conventional processes, and, significantly, also contribute to a reduced amount of toxic or odorous by-products. Finally, the tube is sintered to obtain the finished overcladding preform. It is expected to also be possible to use the invention, with certain stabilizing/gelling agents, to extrude gel tubes, as disclosed in U.S. provisional patent application serial no. 60/059,950, filed Sep. 26, 1997, entitled "Process for Fabricating Silica Article Utilizing Sol-Gel Extrusion" (our reference Fleming-Hubbauer-Johnson-MacChesney-Stockert-Walz 10-11-41-74-3-4), the disclosure of which is hereby incorporated by reference.

Once the overcladding tube is prepared, it is typically combined with a core rod, and the combination is collapsed together to form the final glass preform, as discussed in U.S. Pat. No. 4,775,401, the disclosure of which is hereby incorporated by reference. It is possible to form the core rod by a variety of methods, including modified chemical vapor deposition (MCVD), outside vapor deposition (OVD), vapor axial deposition (VAD). The MCVD process is discussed in U.S. Pat. Nos. 4,217,027; 4,262,035; and 4,909,816, the disclosures of which are hereby incorporated by reference. The preform is then drawn into fiber by standard methods known to one skilled in the art, such as discussed in F. DiMarcello et al. "Fiber Drawing and Strength Properties," *Optical Fiber Communications*, Vol. 1, Academic Press, Inc., 1995, at 179–248, the disclosure of which is hereby incorporated by reference.

It is possible for a variety of silica bodies, other than optical fiber overcladding tubes, to be prepared by the process of the invention, e.g., silica glass lenses.

EXAMPLES

The data of FIGS. 1 to 8 was obtained according to the following experimental methods. Electro-acoustic measurements were conducted with a MATEC MBS-8000 electronics system. The electro-acoustic measurement device consisted of a piezoelectric transducer mounted on one end of a glass buffer rod. The opposing end of the glass rod had two gold electrodes placed at a fixed distance apart and configured as a disc in parallel to a thin bar. This arrangement ensured precise and reproducible electrode gaps for tuning the applied frequency around its nominal value of 1 MHz to achieve the desired system resonance and maximum signal strength. A test dispersion was placed between the electrodes by partially immersing the electro-acoustic device into the liquid dispersion. Experiments were performed by applying a series of radio frequency voltage pulses (typically 5–10 cycles) between electrodes. Sound waves produced by colloidal particles in the suspension were then coupled to one end of the glass rod and measured at the opposite end by a very sensitive piezoelectric transducer. The glass rod acted as a buffer or delay line, eliminating electrical cross-talk, i.e., an undesirable signal produced by the initial application of the high voltage pulse across the test electrodes.

Electro-acoustic measurements were conducted in a Teflon vessel containing approximately 200 $cm^3$ of the test dispersion. Colloidal dispersions were continuously stirred with an impeller-type mixer. The measurement vessel was equipped with several sensors for measuring the pH, temperature, and electrical conductivity, in addition to the electro-acoustic response. An automatic, computer-controlled reagent delivery system coupled to the cell provided the ability to conduct facile potentiometric titrations of colloidal dispersions. Reagents were delivered using a dual syringe, digital burette with a 0.5 microliter resolution.

A wide range of electro-acoustic experiments were conducted on aqueous silica dispersions. The silica dispersions were pre-stabilized with 0.06 M TMAH to a pH of about 10. The silica had a nominal surface area of about 50 $m^2/g$, and was present in an amount of about 46 wt. %. The experiments were conducted at room temperature (about 21–23° C.), and pH was controlled through the addition of reagent grade chemicals (hydrochloric acid, formic acid). Solutions for titrations and dilutions of the concentrated silica dispersions were prepared with high-purity, organic-free, deionized water having a nominal resistivity of 18 MΩ-cm.

Data from the electro-acoustic evaluation of several dispersions are shown in FIG. 1, which is a plot of pH versus zeta potential (showing the IEP). The dispersions contained 1 volume percent silica, and 1M formic acid was used as the pH-reducing additive. The data showed a clear IEP at a pH of 5.2.

FIG. 2 shows pH versus zeta potential for 1 volume percent silica dispersions at various concentrations of TMAH. The results confirmed that increasing concentrations of $TMA^+$ in the dispersion shifted the IEP to higher pH values.

FIGS. 3 and 4 show pH versus zeta potential for 1 volume percent silica dispersions at various concentrations of DETA and STAR, respectively. The results confirmed that increasing concentrations of these materials in the dispersion shifted the IEP to higher pH values, and also showed that much less DETA and STAR was required to raise the IEP to a certain pH value, compared to the amount of TMAH required to raise the IEP to that same value FIG. 5 is a plot of IEP versus stabilizing/gelling agent concentration for several stabilizing/gelling agents, with TMAH included for comparison purposes. The results showed that as the concentration of agent was increased, an increase in the degree of charge compensation occurs on the silica surface. Thus, less pH-reducing additive was required to neutralize the surface charge of the silica, indicating a higher IEP value.

Figure 7:
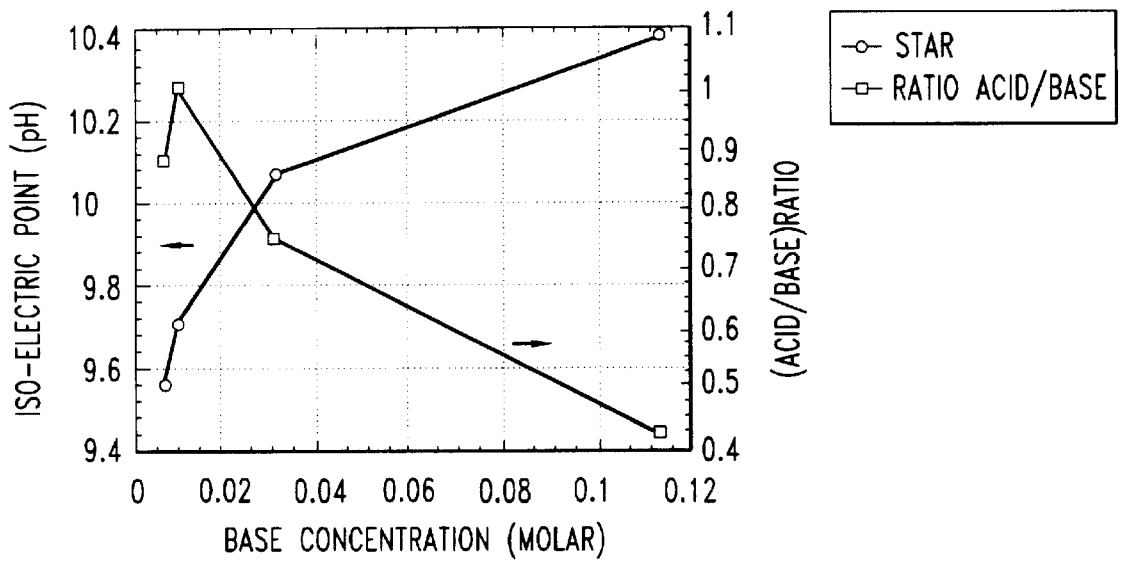

The experiments reflected in FIGS. 6 and 7 show a plot of IEP and the acid/base ratio as a function of stabilizing/gelling agent concentration, for DETA and STAR, respectively. The acid/base ratio refers to the quantity of equivalents of acid (i.e., pH-reducing additive) necessary to titrate the zeta potential of a silica dispersion down to its IEP. The results show, for DETA and STAR, that as the concentration of stabilizing/gelling agent increased, shifting the IEP to higher pH values, less acid was required to reach the IEP, as would be expected. The results were stoichiometric at lower concentrations of DETA and STAR. However, at higher concentrations of DETA and STAR, the results showed charge compensation of silica beyond what would be predicted solely on the basis of stoichiometry.

FIG. 8 reflects a correlation between IEP and mean $pK_a$ for stabilizing/gelling agents of the invention at a concentration of 0.1M. (The value for $NH_4OH$ was measured at 1M.) The correlation provides a useful tool for process design.

What is claimed is:

1. A method for fabricating an article, comprising the steps of:

providing a colloidal silica dispersion comprising a stabilizing/gelling agent, wherein only a portion of the molecules of the agent are ionized in the dispersion; and adding to the silica dispersion a pH-reducing additive, wherein the pH-reducing additive is added in an amount sufficient to ionize at least a portion of the non-ionized molecules of the stabilizing/gelling agent such that gellation of the silica dispersion is induced.

2. The method of claim 1, wherein the pH of the silica dispersion containing the stabilizing/gelling agent is about 8 to about 13.

3. The method of claim 1, wherein the addition of the pH-reducing additive reduces the pH to a value of about 5 to about 13.

4. The method of claim 1, wherein the addition of the pH-reducing additive reduces the pH to within 2 pH units of the mean $pK_a$ of the stabilizing/gelling agent.

5. The method of claim 1, wherein the stabilizing/gelling agent comprises at least one material selected from ammonium hydroxide, a primary amine, a secondary amine, a tertiary amine, and a compound containing at least two of a primary amine, a secondary amine, and a tertiary amine.

6. The method of claim 1, wherein the stabilizing/gelling agent comprises at least one material selected from diethylenetriamine, ethylenediamine, hexamethylenetetramine, N,N'-dimethylethylenediamine, hexamethylenediamine, tris(2-aminoethyl)amine, ethanolamine, propanolamine, and (1-2-aminoethyl)piperazine.

7. The method of claim 1, wherein the stabilizing/gelling agent comprises a multi-valent compound.

8. The method of claim 1, wherein the stabilizing/gelling agent has a mean $pK_a$ of about 5 to about 11.

9. The method of claim 1, wherein less than about 50% of the stabilizing/gelling agent is ionized in the silica dispersion prior to adding the pH-reducing additive.

10. The method of claim 1, wherein the pH reducing additive is selected from methyl formate, ethyl lactate, ethyl formate, methyl acetate, and ethyl acetate.

11. The method of claim 1, further comprising the step of placing the dispersion into a mold prior to or subsequent to the addition of the pH-reducing additive.

12. The method of claim 1, wherein the stabilizing/gelling agent provides the silica dispersion with an iso-electric point of about 6 or higher.

13. The method of claim 12, wherein the stabilizing/gelling agent provides the silica dispersion with an iso-electric point of about 10 or higher.

14. The method of claim 1, wherein the article is an optical fiber overcladding tube.

* * * * *